United States Patent [19]

Razac et al.

[11] Patent Number: 5,409,574
[45] Date of Patent: Apr. 25, 1995

[54] PROPOXYLATED FATTY AMINE ETHOXYLATE SURFACTANTS AS GLASS FIBER DISPERSANTS FOR THE MANUFACTURE OF UNIFORM GLASS FIBER MATS

[75] Inventors: Shafeek Razac, Colonia; Paul E. Eckler, Princeton Junction, both of N.J.

[73] Assignee: Rhone-Poulenc Inc., Princeton, N.J.

[21] Appl. No.: 194,550

[22] Filed: Feb. 10, 1994

[51] Int. Cl.$^6$ ............................................. D21H 13/40
[52] U.S. Cl. ..................................... 162/156; 162/158; 162/182
[58] Field of Search ................. 162/156, 157.1, 157.2, 162/157.3, 157.4, 146, 149, 182; 65/1, 448, 447, 449; 428/357, 391; 106/308

[56] References Cited

U.S. PATENT DOCUMENTS

| | | | |
|---|---|---|---|
| 2,906,660 | 9/1959 | Hungerford et al. | 162/102 |
| 3,012,929 | 12/1961 | Jackson | 162/145 |
| 3,021,225 | 2/1962 | Ziak | 106/78 |
| 3,050,427 | 8/1962 | Slayter et al. | 156/26 |
| 3,103,461 | 9/1963 | Smith et al. | 162/116 |
| 3,108,891 | 10/1963 | Charon et al. | 106/213 |
| 3,228,825 | 1/1966 | Waggoner | 162/145 |
| 3,249,638 | 5/1966 | Muller et al. | 260/571 |
| 3,260,458 | 7/1966 | Klinefelter et al. | 236/66 |
| 3,634,054 | 1/1972 | Sialego | 65/3 |
| 3,766,003 | 10/1973 | Schuller et al. | 162/156 |
| 3,838,895 | 10/1974 | Deem | 303/84 |
| 3,905,067 | 8/1975 | Keib et al. | 19/156 |
| 4,178,203 | 12/1979 | Chakrabarti | 162/156 |
| 4,178,204 | 12/1979 | Chakrabarti | 162/156 |
| 4,178,206 | 12/1979 | Chakrabarti | 162/156 |
| 4,179,331 | 12/1979 | Chakrabarti | 162/156 |
| 4,183,782 | 1/1980 | Bondoc | 162/156 |
| 4,265,704 | 5/1981 | Nahta | 162/156 |
| 4,284,470 | 8/1984 | Bondoc | 162/156 |
| 4,435,474 | 3/1984 | Das et al. | 428/391 |
| 4,457,785 | 7/1984 | Hsu et al. | 106/308 |
| 4,465,500 | 8/1984 | Motsinger et al. | 65/448 |
| 4,681,802 | 7/1987 | Gaa et al. | 65/448 |
| 4,810,576 | 3/1989 | Gas et al. | 428/391 |

FOREIGN PATENT DOCUMENTS

| | | | |
|---|---|---|---|
| 2250719 | 7/1975 | France. | |
| 60-158300 | 7/1985 | Japan. | |
| 2021899 | 1/1987 | Japan | D21H 5/18 |
| 3-44398 | 2/1991 | Japan. | |
| 4263695 | 9/1992 | Japan | D21H 13/40 |

OTHER PUBLICATIONS

Whitewater Chemicals Enhance Formation of Wet--Laid Glass, Nolco Chemical Company.
Critical Process Variables in the White Water System that affect Glass Fiber Dispersion, K. L. Brandenburg, Toppi Journal, Jul. 1993 pp. 145-148.
Dispersants in Wet-Laid Glass Mat=Theory and practice, E. A. Jakush, Tappi Proceedings, 1991 Nonwoven Conerence, pp. 163-172.

*Primary Examiner*—W. Gary Jones
*Assistant Examiner*—Jose A. Fortuna
*Attorney, Agent, or Firm*—Paul J. Juettner

[57] ABSTRACT

In accordance with the present invention, there is provided herein improved glass fiber dispersions for making uniform glass fiber mats by the wet-laid process. The well dispersed glass fiber compositions of this invention usually are prepared by mixing chopped glass fiber bundles in water with a small amount of a propoxylated fatty amine ethoxylate surfactant to disperse the bundles into individual fibers. As a feature of the invention, the dispersions may be formed at relatively high glass fiber consistencies. The resultant dispersions are characterized by low foaming and can be used to make very high quality glass fiber mats at high rates of production.

23 Claims, No Drawings

PROPOXYLATED FATTY AMINE ETHOXYLATE SURFACTANTS AS GLASS FIBER DISPERSANTS FOR THE MANUFACTURE OF UNIFORM GLASS FIBER MATS

BACKGROUND OF THE INVENTION

1. Field of the Invention

This invention relates to the manufacture of uniform glass fiber mats by the wet-laid process, and more particularly, it is concerned with improved glass fiber dispersion compositions for use in such a process.

2. Description of the Prior Art

High strength, uniform, thin sheets or mats of glass fibers are finding increasing application in the building materials industry, as for example, in asphalt roofing shingles and as backing sheets for vinyl flooring. These glass fiber mats are replacing similar sheets made traditionally of asbestos fibers. Glass fiber mats usually are made commercially by a wet-laid process, which is carried out on modified paper making machinery, as described, for example, in the book O. A. Battista, Synthetic Fibers in Papermaking (Wiley) N.Y. 1964. A number of U.S. patents also provide a rather complete description of a wet-laid process, including U.S. Pat. Nos. 2,906,660; 3,012,929; 3,021,255; 3,050,427; 3,103,461; 3,108,891; 3,228,825; 3,634,054; 3,749,638; 3,760,458; 3,766,003; 3,838,995; 3,905,067; 4,179,331 and 4,810,579. The German OLS No. 2454354 (Fr. Demande No. 2,250,719), June, 1975, also is pertinent art in this field.

In general, the known wet-laid process for making glass fiber mats comprises first forming an aqueous suspension of short-length glass fibers under agitation in a mixing tank, then feeding the suspension through a moving screen on which the fibers enmesh themselves while the water is separated therefrom. However, unlike natural fibers, such as cellulose or asbestos, glass fibers do not disperse well in water. Actually, when glass fibers, which come as strands or bundles of parallel fibers, are put into water and stirred, they do not form a well-dispersed system. In fact, upon extended agitation, the fibers agglomerate as large clumps which are very difficult to redisperse.

In an attempt to overcome this inherent problem with glass fibers, it has been the practice in the industry to provide suspending or dispersing aids for the glass fibers, including surfactants, in order to keep the fibers separated from one another in a relatively dispersed state. Such suspending aids usually are materials which increase the viscosity of the medium so that the fibers can suspend themselves in the medium. Some suspending aids actually are surfactants which function by reducing the surface attraction between the fibers. Fatty amine ethoxylates (FAE), amine oxide, nonionic and cationic surfactants are some materials that have been used in the manufacture of non-woven glass fiber mats. However, not all of the available suspending aids are entirely satisfactory for large volume manufacture of useful, uniform glass fiber mats.

For example, such polymeric suspending aids materials as polyacrylamides, hydroxyethyl cellulose and the like, provide a highly viscous aqueous solutions at high material concentrations, but which is difficult to handle, and particularly, which drains very slowly through the mat forming screen, or foraminous belt. Furthermore, the degree of the suspension formed using such materials is only fair, and suspensions having a fiber consistency of more than 0.005% give poor quality mats. The viscous suspensions also trap air upon agitation near the formation zone to form stable foams which adversely affect the uniformity and strength of the mats. Finally, the polymers are not effective at low concentrations, and so are expensive for use in what should be a low cost process.

A number of surfactant materials have been tried for dispersing glass fibers in water, for example, the cationic nitrogen surfactants described in Ger. DT No. 2454354/Fr. Demande No. 2,250,719 (June, 1975). With these surfactants, the glass fiber filaments are drawn from an extruder nozzle, coated with the cationic surfactant, and moistened before chopping into short-length fibers. The chopped fibers then are compounded in another aqueous solution of a cationic surfactant. Accordingly, in this process, the cationic surfactants are applied in two stages to form the desired aqueous dispersion. Furthermore, the quality of the dispersions using the materials of this patent application also is poor. U.S. Pat. No. 4,179,331 shows the use of amine oxides surfactants and Japanese patent applications Nos. 91–44398 and 851158300 show the use of betaine surfactants as dispersants.

It is also known that surfactants can present foaming problems which can result in bubbles in the final product. A surfactant can be used to the extent that it causes foaming problems or to the extent that a defoamer can alleviate the problem. In the former case, this can limit the effectiveness of any particular surfactant. Since the process of making the dispersions can vary, and the rate of foaming can vary, the acceptable levels of surfactant can vary. The use of defoamers, while effective in many cases, but they are not used extensively as they can add extensive costs and make the process uneconomical. While fatty amine ethoxylates are standard dispersants for use in glass fiber matting, these materials can act as foam stabilizers which means for more foam can be observed when used in the presence of soluble extractives from the sizing carried on the fiber.

It is also common to size fibers, the basic functions of a well-designed sizing being: 1) as a lubricant—coolant in the glass forming process and through the chopper to keep the mass of fibers dense; 2) as a moist binding agent to provide 14%–16% water pickup for the 800 to 2,000 filaments per bundle (about 1.5% of the water is size solids, which equals 2,500 ppm size add-on to the glass; 3) as a dispersion aid in the pulper—the carry through of hydrophilic polymers and surfactants will enable the initial breakup of the bundles to occur which adds many of the unknown variables to the white water and 4) as a silane coupling agent for resins.

The dwell time of the fibers in the slusher is critical for the sizing to be fully effective. Downtime and upsets, especially over 45 minutes, can cause extensive leaching of the sizing chemicals into the white water. Subsequent operation of the slusher can show very erratic demand for both dispersant and thickener polymer.

Therefore, it is apparent that for a glass fiber dispersion technique to be effective, it is necessary that the dispersions meet several rigid criteria simultaneously which can provide means for making the desired high quality, uniform glass fiber mats at a rapid rate of production in an economically acceptable process. Such criteria are listed below:

1. The dispersing surfactant should provide a uniform dispersion of glass fibers in water effectively at low surfactant concentrations.
2. The dispersions should be efficient at high glass fiber consistencies so that the mats may be formed without having to expend an unnecessarily large amount of energy to separate and handle large quantities of water.
3. The dispersion compositions preferably should not be accompanied by a substantial increase in the viscosity of the medium, which would necessitate extensive pumping equipment at the screen to separate the fibers from the water, and which would make drying of the wet mat difficult.
4. The dispersion compositions should be capable of producing glass fiber mats which have a uniform distribution of fibers characterized by a multidirectional array of fibers. The finished mat product should possess uniform high-strength properties, particularly good tensile strength.
5. The dispersions should be capable of use in the wet-laid process in conventional equipment, at high rates of mat production, without generation of unwanted foams, and without corroding the plant machinery.
6. The surfactant materials preferably should be readily available, at low cost, and be capable of use either by direct addition to the fibers in water, or by precoating the fibers with the surfactant before admixing with water to form the aqueous dispersion composition.
7. The surfactant materials preferably should be capable of dispersing unsized as well as sized glass fibers.

These and other objects and features of the invention will be made apparent from the following more particular description of the invention.

SUMMARY OF THE INVENTION

In accordance with the present invention, there is provided herein improved glass fiber dispersions for making uniform glass fiber mats by the wet-laid process using propoxylated fatty amine ethoxylates characterized by lower foaming. The propoxylated fatty amine ethoxylates of the invention show more effective results can be achieved with unsized fibers than sized fibers, thereby eliminating a source of expense and difficulty. Unsized is intended to include fibers that are "sized" with water vis-a-vis chemicals. The well dispersed glass fiber compositions of this invention usually are prepared by mixing chopped glass fibers in water with a small amount of an propoxylated fatty amine ethoxylate surfactant. As a feature of the invention, the dispersions may be formed at relatively high glass fiber consistencies. The resultant dispersions then are used to make very high quality glass fiber mats at high rates of production. It has been found that propoxylated fatty amine ethoxylate surfactants can provide reduced foaming while maintaining the efficiency of the dispersant and be effective in dispersing unsized as well as sized fiber.

DETAILED DESCRIPTION OF THE INVENTION

The propoxylated fatty amine ethoxylate surfactants used in the invention can be represented by the general average formula:

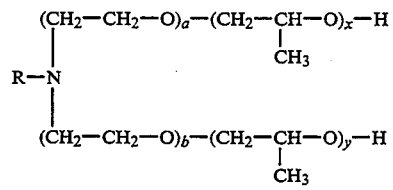

where R suitably represents hydrocarbon groups containing an average value of between 1–30 carbon atoms, and wherein a plus b represent from 0 to about 50 moles ethylene oxide (EO), and x and y represent from 0 to about 20 moles propylene oxide (PO), the sum of a, b, x, and y being at least 2, and preferably from about 6 to about 22, it being understood that a, b, x, and y represent average numerical values and that the formula is an average representation, the various groups being disposed independently in each amine substituent chain, e.g., EO-PO-EO, EO-EO-PO, EO-EO-EO, PO-PO-PO, EO-PO-PO, PO-EO-PO and the like.

The hydrocarbon groups can be aliphatic or aromatic, and, if aliphatic, can be linear, branched or cyclic in nature, and can be the same or different particularly in the case of fatty radicals which are a composite of various chain length materials. The aliphatic hydrocarbon radical can contain ethylenic unsaturation. Preferably the aliphatic groups are selected from among alkyl groups, and substituted alkyl groups thereof, such as long chain alkyl groups, preferably having from 6 to 30 carbon atoms, such as stearyl, lauryl, oleyl, cetyl, tridecyl, tetradecyl, hexadecyl, dodecyl, octadecyl, nonadecyl, tallow, coco, soya, myristyl and other natural fatty radicals from animal, fish, vegetable and oil seed sources (coconut oil, palm kernel oil, babassu oil, rape seed oil, sunflower seed oil and the like) or substituted groups thereof, derived from natural or synthetic sources. These compounds can be illustrated by cocamine ethoxlate propoxylate, laurylamine ethoxylate propoxylate, tallowamine ethoxylate propoxylate, oleylamine ethoxylate propoxylate, stearylamine ethoxylate propoxylate, myristylamine ethoxylate propoxylate, cetylamine ethoxylate propoxylate and the like.

The surfactants of the present invention function well over a broad pH range at or near neutral conditions, or in basic solution; its dispersion quality is irrespective of the degree of hardness of the aqueous medium; the surfactants of the invention provide denser glass mats than conventional dispersants at equal and lower use levels: better uniformity and alignment of glass fibers in all directions; the dispersants are effective with sized and unsized glass fibers; and amphoteric surfactants tend to be milder and more environmentally friendly.

Uniform and dense mats are the key objectives in the production of glass fiber mats. These properties are dependent on several chemical factors such as dispersants, viscosity modifiers, defoamers, water hardness, electrolytes, sizing aids, and biocides; and mechanical factors such as temperature, agitation, addition order of raw materials and the like.

The dispersants role in the white water environment is to aid in the dispersion of fibers in the water, maintain the suspension until the slurry is in the formation zone, and rapid drainage of the water to the desired two dimensionally anisotropic non-woven web.

In a typical wet-laid process for making glass fiber mats, a stock suspension of the fibrous material of predetermined fiber consistency is prepared in a mixing tank. The suspension then is pumped into a head box of a paper-making machine where it may be further diluted with water to a lower consistency. The diluted suspension then is distributed over a moving foraminous belt under suction to form a non-woven fiber structure or wet mat on the belt. This wet mat structure may be dried, if necessary, then treated with a binder, and, finally, thoroughly dried to give a finished non-woven mat product.

In the process of the present invention for the production of glass fiber mats, the glass fiber filaments or strands generally are chopped into bundles of fibers about 6.35 millimeters (¼") to 76.2 millimeters (3") in length, usually about 12.7 millimeters (½") to 50.8 millimeters (2 "), and preferably about 25.4 millimeters (1") long, and usually about 3 to 20 microns in diameter, and, preferably about 15 microns. In one embodiment, the fibers are added to water containing the fatty amine alkoxylate surfactant of the invention to form a well-dispersed composition. Suitably, the propoxylated fatty amine ethoxylate is present at a concentration of about 5–500 ppm of the solution and preferably about 10–25 ppm. Alternatively, the chopped glass fibers may be coated initially by spraying or otherwise applying the fatty amine ethoxylate surfactant thereon, and then dispersing the coated fibers in the aqueous medium. Suitably, the coated fibers contain about 0.01 to 1% by weight of the propoxylated fatty amine ethoxylate, and, preferably, between 0.025 to 0.25%.

As a feature of the invention, the glass fibers may be dispersed in the propoxylated fatty amine ethoxylate surfactant at relatively high fiber consistencies while still retaining the effective dispersion characteristics of the composition. For example, a fiber consistency of from about 0.001% to about 3.0% may be used, and, preferably, about 0.05% to about 1% is employed, based upon the weight of the fibers in the water. Such compositions furnish excellent dispersions when agitated in conventional mixing equipment. As mentioned, if desired, the highly concentrated fiber dispersion compositions may be diluted at the head box, usually to a consistency of about 0.1% to about 0.3%, and preferably about 0 2% which however is still a highly concentrated fiber dispersion by conventional standards.

The dispersion compositions of the invention are formed without any substantial change in the viscosity of the medium, or of generation of unwanted foams during the process. Furthermore, the dispersions preferably are prepared at or near a neutral pH condition, or perhaps under slightly alkaline conditions, again, without affecting the good quality of the dispersions, or of the finished glass mat products produced therefrom.

The dispersion compositions of the invention produce glass fiber mats which have a high density of fibers therein which are uniformly distributed throughout the mat in a multidirectional array. The finished mats show excellent tensile strength properties, too. The rate of production of the mats is very rapid, in this invention. In fact, a rate of mat production of over 152.4 meters/min. (500 linear ft./min.) using conventional paper-making equipment is readily achievable in this process.

The examples which follow will further illustrate the invention, but are not to be considered as being limiting of the principles or practice of the invention.

In Example 1, which includes Tables I and II below, is a compilation of experimental data to compare the dispersing abilities of the propoxylated fatty amine ethoxylate surfactants of the invention with other well-known surfactant materials of the prior art. In Table I, compound 1, Group A, illustrates the propoxylated fatty amine ethoxylate. The remaining compounds 2–24, Groups B–G, are representative of other surfactant materials.

The experiments used in these examples utilized wet chop E-glass. Two types of E-glass were used: 1) standard sized (cationic) E-glass and 2) unsized (deionized water sized) E-glass. The fiber bundles were 32 mm in length and 15 micron in diameter. Both the sized and unsized E-glass contained 12%–16% moisture (water pick-up). The unsized E-glass was not a commercially standard material.

For these tests, the surfactant compounds were dissolved in water at various concentrations, ranging from 20 ppm (0.002%) to 2.5 ppm (0.00025%) by weight of the surfactant (actives basis) in water.

A given dispersion was matted and was rated on a scale of 1 to 5; a rating of 1 was given to a poorest E-glass mat formation where the fiber strands agglomerated and/or did not open up as individual fibers. The handsheet produced by not using any dispersant was rated as 1 and used as the control. The highest quality of dispersed fibers in the handsheet was rated as 5 in which all fibers were separated from each other and the mat was uniform and dense. Intermediate ratings of 4, 3, and 2 were given to E-glass handsheets with a gradual trend to clumped fibers and anisotropic formation. The difference between integers is considered significant. The data was obtained by averaging the sensory observations of two researchers.

EXAMPLE 1

To a 4 liter beaker was added 700 milliliters of deionized water. The amount of surfactant, based on the actives concentration, was then added, from 5 to 20 ppm. The contents of the beaker were stirred on a magnetic stirrer. Record was kept of the pH. The contents of the beaker were transferred to a Premier mixer with a Cowls mixing blade. The agitator was run at 1000 rpm. 3.5 grams of chopped bundles of E-glass filaments (32 millimeters in length and 15 micron in diameter) were then added and vigorously dispersed for 5 minutes. The agitation was stopped to measure foam height. The slurry was added to the headbox of a papermaking machine and the volume was increased to 7 liters with tap water to allow a 1:10 dilution or 0,043% consistency, dry basis of glass fibers. The dispersion then was carried through a laboratory Williams paper-making apparatus to form a 254 millimeters×25.4 millimeters (10 "×1") mat product. The glass fibers in this mat were very evenly distributed throughout.

The dispersant, propoxylated fatty amine ethoxylate was effective over a wide pH range (5.0 to 9.0). The fatty amine alkoxylate of the invention was effective in dispersing sized and unsized fibers.

TABLE I

(List of Surfactants Tested)

| COMPOUND # | CHEMICAL DESCRIPTION |
|---|---|
| GROUP A. | PROPOXYLATED FATTY AMINE ETHOXYLATE |
| 1. | TALLOWAMINE + 8 EO + 2 PO |
| 2. | TALLOWAMINE + 8 EO + 4 PO |
| 3. | TALLOWAMINE + 12 EO + 2 PO |
| 4. | TALLOWAMINE + 12 EO + 4 PO |
| GROUP B. | FATTY AMINE ETHOXYLATES |
| 5. | TALLOWAMINE + 8 EO |
| 6. | TALLOWAMINE + 5 EO |
| 7. | COCAMINE + 12 EO |
| GROUP C. | AMINE OXIDE |
| 8. | LAURYL AMINE OXIDE |
| GROUP D. | ALKYL PHOSPHATE ESTERS |
| 9. | NONYL PHENOL + 6 EO PHOSPHATE |
| 10. | BUTANEDIOL + 6 EO PHOSPHATE |
| 11. | $C_2$-$C_{10}$ ALCOHOL PHOSPHATE |
| 12. | PHENOL + 6 EO PHOSPHATE |
| 13. | NONYL PHENOL + 9 EO PHOSPHATE |
| 14. | TRISTRYL PHENOL + 16 EO PHOSPHATE |
| GROUP E. | AMPHOTERICS |
| 15. | ALKYL ETHER HYDROXY SULTAINE |
| 16. | SODIUM COCOAMPHO PROPIONATE |
| 17. | DISODIUM COCOAMPHO DIPROPIONATE |
| 18. | SODIUM CAPRYLOAMPHO HYDROXYL PROPYL SULFATE |
| 19. | SODIUM CAPRYLOAMPHO DIACETATE |
| 20. | SODIUM MIXED $C_8$ AMPHO CARBOXYLATE |
| 21. | COCAMIDOPROPYL BETAINE |
| GROUP F. | IMIDAZOLINE |
| 22. | TALL OIL IMIDAZOLINE |
| GROUP G. | MODIFIED NONIONICS |
| 23. | TRIMETHYOL PROPANE + 75 EO |
| 24. | MEROXIPOL 311 |
| 25. | POLOXYMER 181 |
| 26. | POLOXYMER 182 |
| 27. | $C_{10}$-$C_{12}$ ALCOHOL + EO + PO + ACETATE |

TABLE II

QUALITY RATINGS OF GLASS FIBER DISPERSIONS USING THE SURFACTANT COMPOUNDS OF TABLE I AT VARIOUS CONCENTRATIONS

| | COMPOUND # | UNSIZED FIBERS 5 ppm | UNSIZED FIBERS 10 ppm | UNSIZED FIBERS 20 ppm | SIZED FIBERS 5 ppm | SIZED FIBERS 10 ppm | SIZED FIBERS 20 ppm |
|---|---|---|---|---|---|---|---|
| Control (No surfactant) | | 1 | 1 | 1 | 1 | 1 | 1 |
| Group A. | 1 | 4 | 4 | 4 | 2 | 3 | 3 |
| | 2 | 4 | 4,5 | 4,5 | 3 | 4 | 4 |
| | 3 | 4 | 4,5 | 4,5 | 3 | 4 | 4 |
| | 4 | 3 | 5 | 5 | 2 | 3 | 4 |
| GROUP B. | 5 | 2 | 3,4 | 4 | 2 | 3 | 3,4 |
| | 6 | 3 | 3 | 3,4 | 3 | 3 | 3 |
| | 7 | 3 | 3 | 4 | 2 | 3 | 3 |
| Group C. | 8 | 2 | 3 | 4 | 2 | 3 | 4 |
| GROUP D. | 9 | 1 | 1 | 2 | 1 | 1 | 2 |
| | 10 | 1 | 1 | 1 | 1 | 1 | 1 |
| | 11 | 1 | 1 | 1 | 1 | 1 | 1 |
| | 12 | 1 | 1 | 1 | 1 | 1 | 1 |
| | 13 | 1 | 1 | 1 | 1 | 1 | 1 |
| | 14 | 1 | 1 | 1 | 1 | 1 | 1 |
| Group E. | 15 | 1 | 1 | 2 | 1 | 1 | 2 |
| | 16 | 1 | 1 | 2 | 1 | 1 | 2 |
| | 17 | 1 | 1 | 2 | 1 | 1 | 2 |
| | 18 | 1 | 1 | 2 | 1 | 1 | 2 |
| | 19 | 1 | 1 | 2 | 1 | 1 | 2 |
| | 20 | 1 | 1 | 2 | 1 | 1 | 2 |
| | 21 | 1 | 1,2 | 3 | 1 | 1,2 | 2 |
| Group F. | 22 | 1 | 1 | 1 | 1 | 1 | 1 |
| GROUP G. | 23 | 1 | 1 | 1 | 1 | 1 | 1 |
| | 24 | 1 | 1 | 1 | 1 | 1 | 1 |
| | 25 | 1 | 1 | 1 | 1 | 1 | 1 |
| | 26 | 1 | 1 | 1 | 1 | 1 | 1 |
| | 27 | 1 | 1 | 1 | 1 | 1 | 1 |

From the data in Tables I and II, it is evident that the propoxylated fatty amine ethoxylate surfactants of the invention (Group A) are outstandingly superior to the other surfactants in their ability to form uniform dispersion glass fiber compositions in water. The cationic surfactants (Group B), for example, are poor dispersing agents for glass fibers, particularly at low concentrations. Similarly, the other surfactants (Groups C-H) also form very poor fiber dispersions, irrespective of their concentration. In summary, only the surfactants of Group A exhibit high quality dispersion ratings and as will be shown later, they form the desired high quality glass fiber mats in the wet-laid process suitable for use in-the building material industry.

Foamability of the propoxylated fatty amine ethoxylates were evaluated using the Ross-Miles Foam Height Test as outlined in ASTM method D1173 and compared to a non-propoxylated fatty amine ethoxylate control system. The test comprises dropping a measured amount of surfactant solution (0.1% active) from a specific height into a receiver of standard dimensions using a constant volume of solution of 250 milliliters at a constant temperature and recording the initial foam height above 250 milliliters (Initial Foam Height—FHi), and the foam height above 250 milliliters after five minutes (Foam Height at 5 Minutes—FH5). The foam was evaluated and the following results were obtained:

TABLE III

ROSS-MILES FOAM HEIGHT of 0.1% ACTIVE SINGLE SURFACTANT SOLUTIONS AT ROOM TEMPERATURE

| FATTY AMINE ETHOXYLATE | INITIAL FOAM HEIGHT | FINAL FOAM HEIGHT |
|---|---|---|
| TALLOWAMINE + 8 EO + 2 PO | 93 | 44 |
| TALLOWAMINE + 8 EO + 4 PO | 85 | 54 |
| TALLOWAMINE + 12 EO + 2 PO | 83 | 30 |
| TALLOWAMINE + 12 EO + 4 PO | 85 | 45 |
| CONTROL | | |
| TALLOWAMINE + 8.3 EO | 92 | 88 |

This data shows that the propoxylated fatty amine ethoxylates of the invention while initially foaming to about the same extent as the control provide unstable foams that degrade to about half the initial foam height after 5 minutes. The foam formed from the control is very stable, not having degraded after 5 minutes.

While the invention has been described with reference to certain embodiments thereof, it will be understood by those skilled in the art that certain changes and modifications may be made which are within the skill of the art. Accordingly, it is expected to be limited by the appended claims only, in which:

What is claimed is:

1. In the manufacture of uniform glass mats at a high rate of production by the wet-laid process, the improved method which comprises:
   a) forming an aqueous dispersion of glass fibers by mixing bundles of said fibers of about 6.35 to about 76.2 millimeters (¼ to 3 inches) in length in an aqueous medium at a fiber consistency of about 0.001% to about 3.0% with about 5 ppm to about 500 ppm of an propoxylated fatty amine ethoxylate surfactant having the formula:

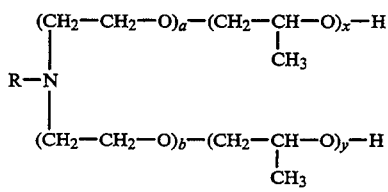

where R suitably represents hydrocarbon groups containing an average value of between 1-30 carbon atoms being the same or different, and wherein a plus b represent from 0 to 50 moles ethylene oxide, and x and y represent from 0 to 20 moles propylene oxide, a, b, x, and y being independent and representing average values, the sum of a, b, x, and y being at least 2 thereby to substantially disperse said bundles into individual fibers within the aqueous medium, and,
   b) passing said dispersion through a mat-forming screen to form the desired uniform glass fiber mat.

2. A method according to claim 1 wherein the R radical is aliphatic.

3. A method according to claim 1 wherein the sum of a and b ranges from about 4 to 20.

4. A method according to claim 1 wherein the sum of x and y ranges from about 2 to 20.

5. A method according to claim 1 wherein R is a long chain alkyl or alkyl substituted group having from about 6 to about 22 carbon atoms.

6. A method according to claim 1 wherein said propoxylated fatty amine ethoxylate is present in an amount of about 5-100 ppm of said aqueous dispersion.

7. A method according to claim 1 wherein said amount of said propoxylated fatty amine ethoxylate is about 10-25 ppm.

8. A method according to claim 1 wherein said glass fibers are diluted from a more concentrated consistency to a lower consistency before being passed through said mat-forming screen.

9. A method according to claim 1 wherein consistency is about 0.05 to about 1%.

10. A method according to claim 1 wherein said propoxylated fatty amine ethoxylate is cocamine ethoxylate propoxylate.

11. A method according to claim 1 wherein said propoxylated fatty amine ethoxylate is laurylamine ethoxylate propoxylate.

12. A method according to claim 1 wherein said propoxylated fatty amine ethoxylate is tallowamine ethoxylate propoxylate.

13. A method according to claim 1 wherein the sum of a, b, x, and y ranges from about 6 to about 22.

14. A method according to claim 1 wherein said fibers are about 12.7 to 50.8 millimeters in length.

15. A method according to claim 1 wherein said fibers are about 3 to about 20 microns in diameter.

16. A method according to claim 1 further characterized in that the dispersion is prepared at or near a neutral pH condition.

17. A method according to claim 1 further including the steps of drying and curing said mat with a binder to form a finished mat product of high quality.

18. A method according to claim 1, wherein said fibers are about 25.4 millimeters in length.

19. A method according to claim 1, wherein said fibers are about 15 microns in diameter.

20. A method according to claim 1 wherein the fibers are unsized.

21. A method according to claim 1 which further comprises:
   (a) precoating said glass fibers with said propoxylated fatty amine ethoxylate, having the formula of claim 1, and;
   (b) adding said thus-coated fibers to an aqueous medium to form said desired dispersion.

22. A method according to claim 21 wherein said coated fibers contain about 0.01 to 1% by weight of said propoxylated fatty amine ethoxylate.

23. A method according to claim 21 wherein the fibers are coated with between 0.025 to 0.25% of the propoxylated fatty amine ethoxylate.

* * * * *